May 20, 1969   R. E. ANDERSON   3,444,988
FASTENER FOR UNSEALED INDICATOR CASES
Filed Dec. 30, 1965
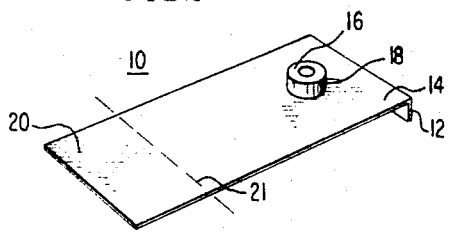
FIG.1
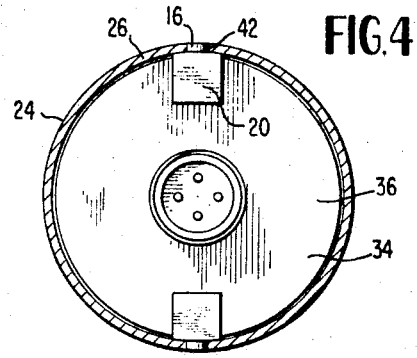
FIG.4
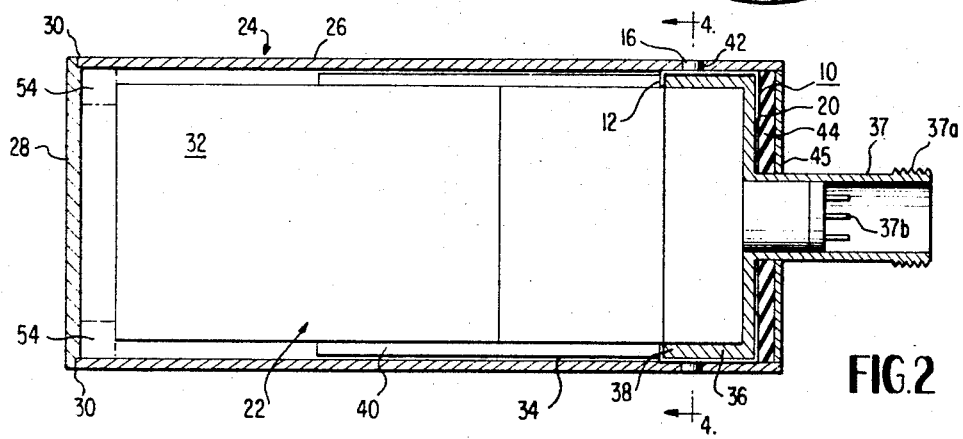
FIG.2
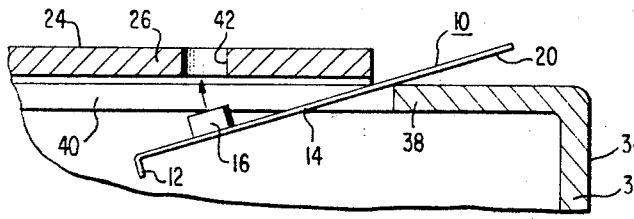
FIG.3
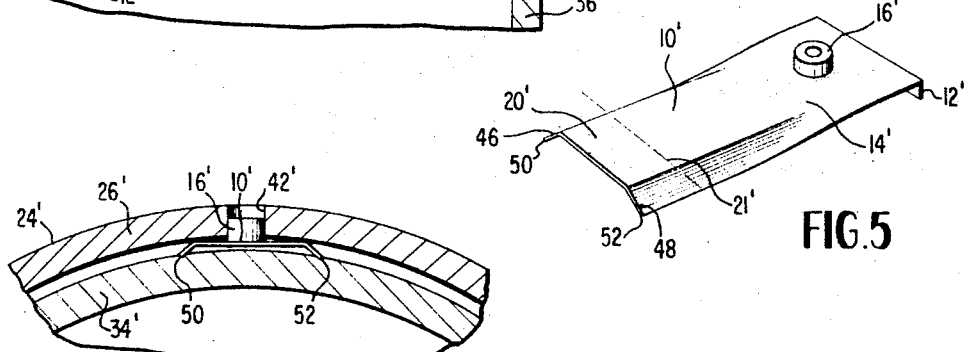
FIG.5
FIG.6
INVENTOR
RICHARD E. ANDERSON
BY
ATTORNEY United States Patent Office 3,444,988
Patented May 20, 1969

3,444,988
FASTENER FOR UNSEALED INDICATOR CASES
Richard E. Anderson, Lynn, Mass., assignor to General
 Electric Company, a corporation of New York
Filed Dec. 30, 1965, Ser. No. 517,759
Int. Cl. F16b 2/00, 5/12, 17/00, 21/00
U.S. Cl. 206—1                                        3 Claims

ABSTRACT OF THE DISCLOSURE

An assembly including a housing having an aperture through its wall, a member in the housing, and a fastener having a medial portion disposed between the wall and the member with a transverse portion extending into the aperture, an anterior portion extending transversely, anteriorly of the member and a posterior portion extending transversely posteriorly of the member.

---

This invention generally relates to a locating and fastening means and more specifically to a means adapted to locate and fasten a member within a housing.

This invention has general application whenever a first member is to be located and fastened in a housing in what is commonly known as a nested relationship. One example of such an application is an instrument assembly which is to be located and fastened within a housing. In this particular application and many similar applications, solder, screws, or other means have been used to fasten the member to the housing; but these locating and fastening means sometimes proved to be unsatisfactory.

Soldering, for example, requires that heat be applied to an instrument assembly or a supporting frame, and such heat can be injurious in this application. The use of screws or other conventional fastening means can increase the outer size of the housing; and in some applications this can be a problem where there are strict space requirements.

Therefore, it is an object of the invention to provide a locating and fastening means for two nested members.

It is another object of this invention to provide a locating and fastening means which locates and fastens a first member within a second member.

When two nested members are located and supported by conventional means, it is often difficult to separate the members with ease. Again, for example, if soldering is used, the members must be heated, cleaned, and re-soldered at each separation. If sheet metal screws are used, the threads can become stripped. Other locating and supporting means may include similar difficulties when the members must be separated on different occasions.

Therefore, another object of this invention is to provide a locating and fastening means for two nested members which facilitates separation and reassembly of the members.

Summary

Briefly stated, this invention can be used whenever it is desired to locate and fasten a first member within a housing in a nonsealed structure. A locating and fastening means supports the member within the housing and includes means to engage the wall of the housing to locate the locating and fastening means with respect to the housing in a fixed location. Means also engage the member to locate the member with respect to the housing and other means engage and lock the member between the two engaging means and to the housing by the projecting means.

This invention is set forth with particularity in the appended claims. The organization, advantages, and further objects of the invention may be better understood, however, by reference to the following description of a locating and fastening means taken in conjunction with the accompanying drawings and description.

Brief description of the drawings

FIGURE 1 presents a perspective view of a locating and fastening means which includes the concepts of this invention.

FIGURE 2 shows a housing and a member inserted therein located and fastened by the means shown in FIGURE 1 in accordance with this invention.

FIGURE 3 illustrates the housing and the member shown in FIGURE 2 during assembly wherein the locating and fastening means shown in FIGURE 1 is positioned for assembly.

FIGURE 4 presents a sectional view along lines 4—4 shown in FIGURE 2 with some of the elements shown in FIGURE 2 shown in elevation and others removed.

FIGURE 5 presents a perspective view of a locating and fastening means in an alternative embodiment.

FIGURE 6 is a partial sectional view along lines 4—4 in FIGURE 2 in which the locating and fastening means shown in FIGURE 5 is used.

Description of the preferred embodiment

Referring to FIGURE 1, the locating and fastening means 10 is shown as being formed of a material such as brass or phosphor bronze in a strip form which is bendable and yet relatively stiff or inflexible as noted hereinafter. A lip or anterior portion 12 is formed by bending a first end portion at substantially right angles to a body or medial portion 14. Formed on body portion 14 adjacent lip 12 is a projection 16 which extends oppositely to lip 12. Projection 16 can be formed by many methods such as punching to form an integral projection, riveting so that the rivet constitutes the projection or, as shown in FIGURE 1, dimpling body portion 14 and soldering or welding a ring member 18 thereto. In addition, locating and fastening means 10 includes an end or posterior portion 20 which is separated from body portion 14 by a bending axis shown as 21. The distances between projections 16 and lip 12 and projections 16 and bending axis 21 are dependent upon the particular housing and member as best understood by reference to FIGURE 2.

In FIGURE 2 two locating and fastening means 10 are shown supporting a member 22 within a housing 24. Housing 24 comprises a wall member 26 and an end member 28 joined to wall members 26 at 30. As shown herein, housing 24 is cylindrical; however, it should be obvious that a housing having any cross section can be adapted to utilize this invention. Member 22 consists of a unit 32 supported by a frame 34 in this particular embodiment. In addition, frame 34 has an end portion 36 which substantially closes the opening of housing 24 formed by walls 26 at the end opposite end member 28. If electrical connections to unit 32 are required, they can be made by means of an optional terminal assembly 37 comprising a threaded portion 37a and terminal prongs 37b. End portion 36 also includes a lip 38 etxending axially toward unit 32 and terminating in a plurality of spaced supporting members 40 which engage unit 32 to position it with respect to end portion 36 of frame 34.

In order to position frame 34 in housing 24, two apertures 42 are formed through housing wall 26 so that frame 34 is properly located in housing 24 when projection 16 registers with aperture 42 and lip 12 engages an edge of lip 38. When the frame 34 is properly positioned with respect to housing 26, the lip 38 abutting lip 12, end portion 20 of locating and fastening means 10 is bent about bending axis 21 until it contacts the outer surface of end portion 36. In this position, it can be seen that lip 38 is clamped between lip 12 and end portion 20 of locating and fastening means 10. In addition, locating and fastening means 10 is fixedly located with respect to wall 26 by means of projection 16 which extends into aperture 42.

In addition, in order to preclude dust or other foreign particles from entering housing 24, a dust shield comprising a resilient member 44 and a supporting plate 45 covers the opening in housing 24. The dust shield is placed over terminal assembly 37 and forced axially against end portion 36 and end portions 20 of locating and fastening means 10 to substantially seal housing 24 from dust particles and other foreign matter. Further, the dust shield retains end portion 20 in its bent position more effectively.

Referring now to the material which forms locating and fastening means 10, it must be bendable so that lip 12 and end portion 20 can be formed with relative ease. Especially, end portion 20 should be easily bendable by hand over the end portion 36 of frame 34. If, however, the material which forms locating and fastening means 10 is too resilient, forces which tend to pull frame 34 out of housing 24 could cause end portion 20 to straighten out with respect to body portion 14 and thereby slip from between the end portion 36 and the dust shield thereby permitting the frame 34 to be removed. Therefore, locating and fastening means 10 should be formed of the material which is sufficiently stiff to withstand any such force, especially if a dust shield or other hold-down means is not used. For this reason, Phosphor bronze is one of the preferred materials as it withstands such normally occurring forces.

FIGURE 3 shows a partial view of a step during the assembly of frame 34 into housing 24. In FIGURE 3 the wall member 26 and aperture 42 formed therein are shown as being slightly displaced from frame member 34 including supporting arm 42. A locating and fastening means 10 has been inserted so that lip 12 is located within housing 24 and so that projection 16 is aligned with aperture 42. As frame 34 is pushed to the left as shown in FIGURE 3, interference between body portion 14 and lip 38 causes locating and fastening means 10 to pivot about lip 38 until projection 16 seats aperture 42. Frame 34 can then be pushed further to the left until the edge of lip 38 abuts lip 12. At this time, end portion 20 of locating and fastening means 10 can be bent over and into end portion 36 of frame 34 to complete the assembly as shown in FIGURE 2.

FIGURE 4 shows a sectional view along lines 4—4 shown in FIGURE 2. The manner in which end portions 20 are folded over end portion 36 of frame 34 is clearly visible as is the manner in which projection 16 extends through aperture 42 in wall 26. As will be noted in FIGURE 4, locating and fastening means 10 are not free to rotate or move about the housing 24. This feature of locating and fastening means 10 can be used to additionally prevent rotation of frame 34 if apertures 42 are formed in wall 26 in an angular position so that lips 12 on locating and fastening means 10 abut oppositely disposed edges of supporting means 40. In this manner, the side edge of lip 12 interferes with supporting member 40 to prevent rotation of frame 34 with respect to locating and fastening means 10.

If the supporting means 40 are not disposed as shown in FIGURE 2 so that the side abutment cannot be obtained between supporting member 40 and lip 12 or if no frame member is to be used, a locating and fastening means of an alternate embodiment shown in FIGURE 5 can be used. Locating and fastening means 10' shown in FIGURE 5 includes a lip portion 12', a body portion 14', a projection 16', and an end portion 20' which is separated from body portion 14' by bending axis 21'. However, in this embodiment longitudinally extending edges 46 and 48 are bent slightly downward to form cutting edges 50 and 52. As is shown in FIGURE 6, when locating and fastening means 10' is located with its projection 16' in an aperture 42' of a housing member 24' having a wall portion 26', cutting edges 50 and 52 penetrate the surface of a frame member 34'. When this penetration is obtained, rotational motion of frame 34' is limited.

In some applications, such as instrument assemblies, it may be necessary to locate unit 32 with respect to end member 28 accurately. To accomplish this a stop member, shown in phantom by 54, could be properly located with reference to end member 28. When this locating means is used, lip 12 in FIGURE 1 does not engage the edge of lip 38, and member 22 is then clamped between stop member 54 and end portion 20 of locating and fastening means 10. Similarly, lip 12' in FIGURE 5 can be eliminated when stop member 54 is used. Also, it is then obvious that the position of apertures 42 is not critical as discussed hereinabove.

Briefly summarizing, the locating and fastening means shown herein can be used to locate and fasten a member within a housing simply and effectively. The locating and fastening means comprises means to engage the member to be inserted into the housing, means acting in conjunction with the engaging means to clamp the structure with reference to the locating and fastening means, and a third, wall-engaging means to fixedly locate the locating and fastening means with reference to a wall of the housing. In this manner, the member is held in a fixed relationship to the housing and additional means can be provided to prevent any rotational motion of the member with respect to the housing.

It is obvious that other embodiments can be provided for other configurations of the housing and a first member. For instance, if the cross section of the housing and of the frame member adjacent the opening in the housing were rectangular, it would merely be necessary to locate an aperture in the wall and the wall-engaging means on the locating and fastening means so that the member were in proper relationship to the housing.

What I claim as new and desire to secure by Letters Patent of the United States is:

1. An assembly comprising:
   a housing;
   a member disposed in said housing; and
   a fastener for fixedly locating said member in said housing;
   said housing including:
      a first aperture adapted to pass said member therethrough;
      a wall portion with a second aperture therethrough;
   said member including:
      a first portion for substantially obturating said housing first aperture;
      a second portion overlying said housing second aperture and terminating adjacent thereto when said member is disposed in said housing;
   said fastener formed of an elongated, integral strip including:
      a medial portion, disposed substantially between said housing wall portion and said member, having a sub-portion extending transversely away from said member into said housing second aperture;
      an anterior portion extending transversely away from said housing wall portion and anteriorly engaging said member second portion; and a posterior portion extending transversely away from said housing wall portion and posteriorly engaging said member first portion.

2. An assembly comprising:
   a cylindrical housing open at one end and having an annular wall with a plurality of apertures transversely therethrough;
   a member comprising an instrument and support frame therefor, disposed within said housing through said one end thereof;
      said support frame having a transversely extending posterior portion, including a posterior transverse surface, which portion substantially obturates said housing open end, and an anterior portion including an anterior transverse surface, and a plurality of fasteners;
    each fastener formed of an elongated, integral strip including:
        a medial portion, disposed between said housing annular wall and said frame, having a subportion extending transversely away from said frame into a respective housing aperture;
        an anterior portion extending transversely away from said housing wall portion and anteriorly overlaying said frame anterior transverse surface,
        a posterior portion extending transversely away from said housing wall portion and posteriorly overlaying said frame posterior transverse surface.

3. An assembly according to claim 2 wherein:
each said fastener includes means to penetrate the surface of said frame to thereby substantially eliminate relative circumferential movement between said frame and said housing.

References Cited

UNITED STATES PATENTS

| | | | |
|---|---|---|---|
| 351,278 | 10/1886 | Moore | 217—70 |
| 648,012 | 4/1900 | Wilton | 217—89 |
| 1,430,420 | 9/1922 | Walker | 217—89 |
| 2,700,457 | 1/1955 | Munroe | 217—69 |
| 2,281,103 | 4/1942 | MacDonald. | |
| 2,510,745 | 6/1950 | Kilgore | 220—55 X |
| 1,121,934 | 12/1914 | Miller | 220—17 |

FOREIGN PATENTS 509,068    7/1939    Great Britain.

MARTHA L. RICE, *Primary Examiner.*

U.S. Cl. X.R.

217—56, 69; 220—55